United States Patent
Huai

(10) Patent No.: US 9,629,186 B2
(45) Date of Patent: Apr. 18, 2017

(54) DEVICE AND A METHOD OF AN EMERGENCY HANDLING WIRELESS COMMUNICATION SYSTEM

(71) Applicant: Xiaoning Huai, Sunnyvale, CA (US)

(72) Inventor: Xiaoning Huai, Sunnyvale, CA (US)

( * ) Notice: Subject to any disclaimer, the term of this patent is extended or adjusted under 35 U.S.C. 154(b) by 9 days.

(21) Appl. No.: 14/672,174

(22) Filed: Mar. 29, 2015

(65) Prior Publication Data

US 2015/0350887 A1    Dec. 3, 2015

Related U.S. Application Data

(63) Continuation of application No. 14/548,559, filed on Nov. 20, 2014, now abandoned.

(51) Int. Cl.

| | | |
|---|---|---|
| *H04M 11/04* | (2006.01) | |
| *H04W 76/00* | (2009.01) | |
| *H04W 4/22* | (2009.01) | |
| *G08B 25/00* | (2006.01) | |
| *G08B 25/01* | (2006.01) | |
| *G08B 13/196* | (2006.01) | |
| *G08B 15/00* | (2006.01) | |

(52) U.S. Cl.
CPC .... *H04W 76/007* (2013.01); *G08B 13/19621* (2013.01); *G08B 25/006* (2013.01); *G08B 25/016* (2013.01); *H04W 4/22* (2013.01); *G08B 13/19656* (2013.01); *G08B 15/00* (2013.01)

(58) Field of Classification Search
CPC .......... H04M 11/00; H04M 1/24; H04M 1/64; H04M 1/725; H04M 3/53; H04M 3/5307; H04W 24/00; H04W 4/12; H04W 4/22
USPC .................. 455/404.1, 455.1; 379/21, 26.01
See application file for complete search history.

(56) References Cited

U.S. PATENT DOCUMENTS

| | | | |
|---|---|---|---|
| 6,690,923 B1* | 2/2004 | Ortiz Perez | H04M 1/24 379/21 |
| 2003/0130893 A1* | 7/2003 | Farmer | G06Q 30/0266 705/14.63 |
| 2005/0075116 A1* | 4/2005 | Laird | A61B 5/04 455/456.3 |
| 2009/0003554 A1* | 1/2009 | Katis | H04L 12/1831 379/88.22 |
| 2015/0200988 A1* | 7/2015 | Cabanillas | H04L 65/60 709/203 |
| 2015/0201001 A1* | 7/2015 | Cabanillas | G06Q 50/01 709/203 |

* cited by examiner

*Primary Examiner* — Joseph Arevalo

(57) ABSTRACT

Disclosed are methods for a point to node based surveillance applicable prioritized wireless communication system comprising one or more wireless communication devices and one or more wireless networking nodes using a prioritized wireless communication method, capable of faster response to emergencies and faster and more secured acquisition of real time scene evidences.

12 Claims, 2 Drawing Sheets

DEVICE AND A METHOD OF AN EMERGENCY HANDLING WIRELESS COMMUNICATION SYSTEM

TECHNICAL FIELD

Figure 1:
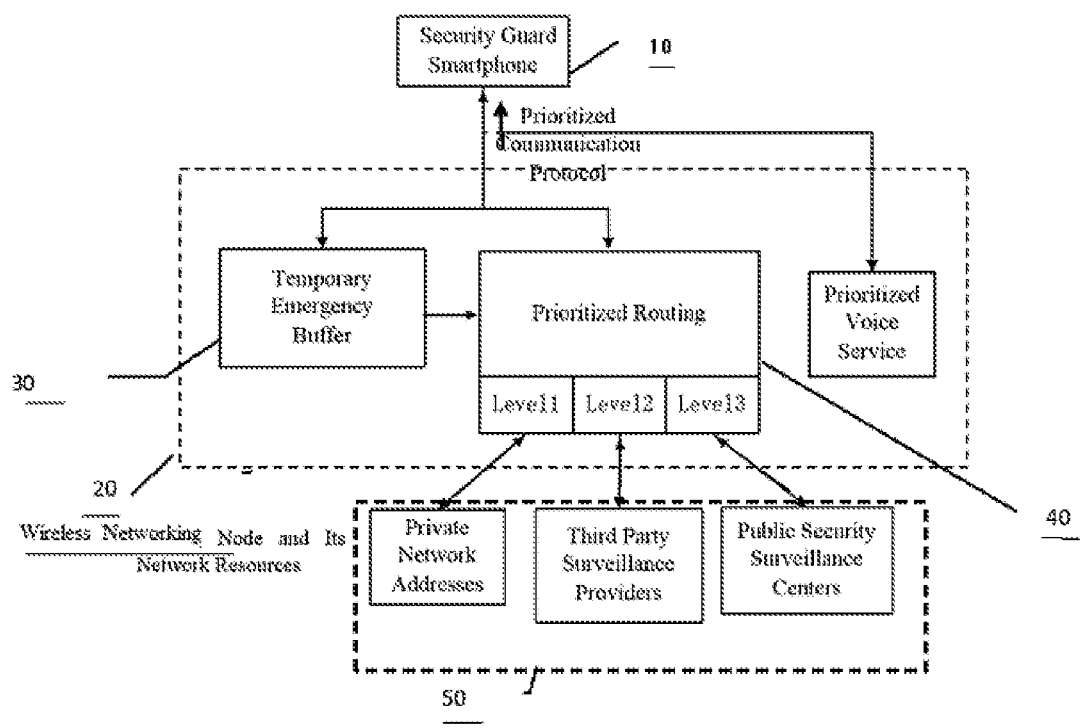

This application involves methods, technologies and applications of wireless devices and network communication system.

BACKGROUND

Conventional video surveillance systems are usually pre-installed and therefore static. Their weakness includes fixed coverage scope and easy to get around. Point to Point based mobile surveillance system and applications have been proposed to complement it. However, their merits suffer from network delay, bandwidth limit among other issues. As mobile phones and other mobile communication devices are becoming more and more popular, being able to collect, process and transmit a rich variety of data such as video, image, GPS among others, with powerful host computation and sensing resources running all kinds of applications, they are applicable yet to provide us a new utility as a personal security guard by working as a mobile surveillance terminal. Off the shelf mobile phones and state of art wireless communication systems have some deficiencies to accomplish this task. Firstly, off the shelf mobile phones are usually not optimized for surveillance operations, and a dedicated optimized design and related service routines are required; Secondly, the time for a mobile communication device to connect to a wireless node in the service area could be delayed due to things like channel congestion and bandwidth limit by state of the art communication methods; Thirdly, the time for the data transmission through the network could also be delayed for similar reasons; Finally, in an extreme case, the person in possession of the device may be in a bad situation not to be able to send an alarm, or the device is damaged or robbed by an offender even before the alarm and related scene information are sent out.

SUMMARY OF THE INVENTION

The intent is to introduce a Point to Node based wireless communication method to build a faster and more reliable real time mobile surveillance network communication system, comprising the following three major components: 1. A mobile phone or other types of mobile communication devices with properly designed features capable of monitoring and analyzing the scene and in emergency situation collecting, processing and sending the data and alarm promptly via the available wireless network. 2. A wireless networking node and system capable of emergency handling mechanisms such as prioritized connecting, transmission and temporary data buffering and storage. 3. A third party surveillance service provider or public security surveillance center at the back end capable of monitoring and processing incoming alarms and data, and responding promptly. The merits of such as a system is faster response to emergencies and faster and more secured acquisition of scene evidences. The advantage of Point to Node over the Point to Point method is such that for the former, transmission could start as soon as the Point Device and the Node are ready, while for the latter, both Points at two ends and wireless network in between need to be ready. Another advantage is for the former, the data transfer bandwidth is more or less only limited by the channel bandwidth between the sending Point and the Serving Node, due to the emergency data could be more or less of a burst nature to start, and temporary data buffering within the wireless node and network could help, even if down streaming has bottle necks.

BRIEF DISCUSSION OF THE DRAWING

FIG. 1 Illustration of the system structure and its operation mechanism

Figure 2:
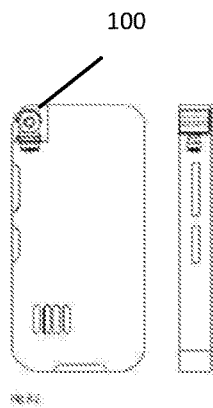
Figure 3:
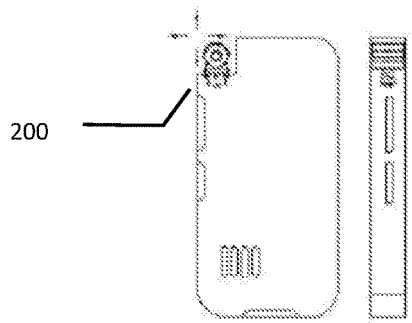
Figure 4:
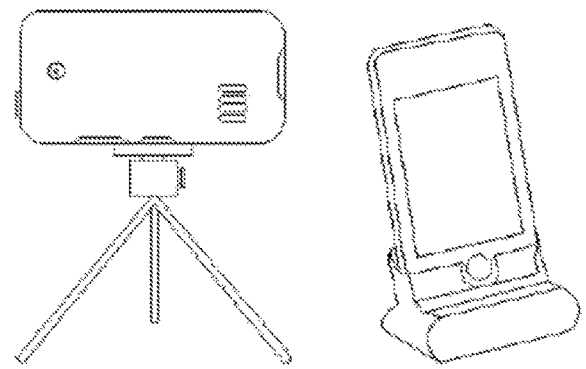

FIG. 2 and FIG. 3 a preferred embodiment of a hidden surveillance panorama camera built into the mobile phone FIG. 4 is an example set up for a surveillance mobile phone application

DETAILED DESCRIPTION

Nomenclature

SG: security guard.
SGP: A security guard mobile telephone or mobile communication device.
Operator: In some mobile phone designs and usage, only the owner as an administrator has the privilege to use all functionalities of the device, though the owner may allow someone else to use the phone as an option. To simplify the description, it is assumed the actual operator of SGP is either the owner or an authorized user, having the same privileges to access the full functions of the SGP and is named operator hereafter in this disclosure.

A point to node wireless network surveillance communication system, as illustrated in FIG. 1, comprises a wireless communication node 20 and a SGP device 10, and the former has prioritized communication protocols including prioritized connection between the node and the device, prioritized routing scheme, including prioritized connection to the SGP device 10 and destination devices and temporary emergency data buffering by the node of the received data from the device, while the latter has an ordinary state and SG state, and the SG state further comprises an Alert Step and an Alarm Step. A SGP could be switched from an ordinary state to SG state by an operator pushing an Alarm Button or ether another interactive method, and when it enters into Alarm Step, the SGP activates SG service routines fast collecting, processing and packaging selectively data such as video, image, GPS, thermostats, gyro sensor, lux meter etc., and uploads the data packets via prioritized data service communication protocols to the wireless networking node, which prioritizes by module 40 the routing of the data packets and at the same time store the data packets in an temporary emergency data buffer 30, wherein storing the data packets in the temporary emergency buffer 30 has a higher priority than routing the data packets if the speed of routing the data packets is slower than storing the data packets in the temporary emergency buffer 30.

The uploaded data packets comprises a header section and a data section, and the header comprises the phone number of the SGP, the Emergency Level Code and network destination addresses. The communication protocol between the wireless network and the SGP supports and interprets the header format and the wireless network supports the prioritized data transmissions and concurrent temporary data buffering.

Besides the operator switching method, the SG Alarm Step could also be triggered by certain preset conditions, and when met, the SGP activates Alarm service automatically.

The activation could also be remotely controlled by an operator, a Third Party Surveillance Provider, or a Public Security Surveillance Center.

Further, the loud speaker of the SGP could be remotely controlled and used to send warning-off message if necessary.

Further, the data uploaded could be captured real time data or pre-acquired history data.

Further, the Alert Step can run in background in the ordinary state, conducting automatic scene analysis, system resource budgeting, wireless network connecting, data collecting, processing and other initialization services. The Alarm Step will be automatically triggered once preset conditions are met.

Further, some selective Alert Step procedures could keep working even when the ordinary services of the SGP is powered off, to provide around the clock protection.

Further, the lux meter on the SGP can switch the camera operation between ordinary illumination and infrared illumination.

Further, a preferred embodiment of a hidden surveillance panorama camera apparatus built into the a corner of the mobile phone to enhance its video surveillance capabilities as illustrated by FIG. 2 and FIG. 3, wherein the panoramic camera operates as an usual fixed view angle camera when under a convertible mechanical cover, and once the cover is removed as in security guard mode, the panoramic camera makes up to three dimensional rotations and translations to acquire panoramic images or videos. The panorama camera apparatus could also be used in non-surveillance mode of the device.

Further, SGPs has have prioritized voice channel connection and usage.

Further, the mobile phone needs to be registered with and granted SGP privilege by the wireless network communication service provider prior to its actual usage, the Emergency Level Code and destination network addresses could be set as default at registration and changed later by an operator, an operator authorized Third Party Surveillance Provider or Public Security Surveillance Center.

Further, the emergency data buffer of the wireless network could reside in a node resource area or its extended network storage area.

Further, the wireless networking node comprises mobile network stations and WIFI AP nodes.

The above described method and system is realized in the following steps:

A mobile communication device acquires the security guard priority communication privilege via a registration process with a security guard wireless network communication service provider; the wireless service provider stores the registered device identification number, Emergency Level Code and destination network addresses of the mobile communication device in the service provider's network prioritized emergency service data base.

The wireless networking node of the service provider checks when receiving a connection request, the identification number of the requesting device to verify if the identification number belongs to a registered security guard mobile-communication device, and if it does, the prioritized communication is granted.

The wireless networking node of wireless network communication service provider acknowledges the connection request from the registered security guard mobile communication device and at the same time initializes prioritized communication process of the wireless networking node and its wireless network, comprising allocation of channel bandwidth and temporary emergency buffer space as well as locating proper back end services available in nearby area of the wireless networking node and the registered security guard mobile communication device.

The registered security guard mobile communication device enters into Alert Step, running procedures to allocate system resources, connect to the wireless networking node, and conduct data collection, processing and scene analysis, and when Alarm Step is triggered, selectively packs the data into data packets and uploaded the data packets to the network via the wireless networking node; The destination addresses and Emergency Level Code within the header section of data packets could be updated.

The wireless networking node prioritizes the routing of uploaded data packets to the destination addresses according to the priorities defined in Emergency Level Code, and store the uploaded data packets to temporary emergency buffer of the wireless networking node concurrently; wherein, if the Emergency Level Code in the data packets indicates a Third Party Surveillance Provider or a Public Security Surveillance Center to be a destination, the wireless networking node checks if the service of the Third Party Surveillance Provider or the Public Security Surveillance Center is available in the serving area of the wireless networking node, and if not, the wireless networking node has the option to route the data packets to applicable Public Security Surveillance Centers as the highest priority.

The networked devices comprising the destinations devices 50 receiving the data packets from the registered security guard mobile communication device have the privilege to remotely control operations of the sending security guard mobile communication device.

An example of the Emergency Level Code organization is illustrated in the below table 1

| 0 | Ordinary State |
|---|---|
| 1 | SG State with Private Addresses (PA) |
| 2 | SG State with Third Party Surveillance Providers (TPSP) |
| 3 | SG State with Public Security Surveillance Centers (PSSC) -> mobile 911 |
| 4 | SG State with PA + PSSC |
| 5 | SG State with TPSP + PSSC |
| 6 | SG State with PA + TPSP + PSSC |

Some application scenarios are as follows. One person is traveling and staying in a hotel suit, who does not expect any visitors or room services when in sleep. The first SGP is set up in Alert Step and the Emergency Level Code at 6, the destination addresses include the person's second SGP nearby the bed. The camera head points to the doorway or the windows, and video surveillance service is on while voice service is off. If there is an intruder trying to enter or entered the room, an alarm signal would wake the person up and the captured image will show up on the screen of the second SGP, which would give the person some time to react. At the same time, the alarm and the captured images are stored in the network and sent to the hotel's security service center and public surveillance center, before the intruder could locate the SGP and damage it. The little time gained by the SGP probably may save the person's life, and the securely stored data could be a valuable evidence in the case.

Using the loudspeaker on the SGP to warn off the intruder could be another interesting application. A robber sneaks into a house trying to find something, who is welcomed by a voice from the SGP:" welcome to this house, your picture has been taken and sent to police". In this and similar scenarios, SGP could not only work as a passive reporter but also an active defender.

Other scenarios including in accidents such as crash, fire, or medical emergencies, where the SGP could trigger the alarms, before the operator could do something or anything.

Finally, although the above description is focused on SGP as a preferred application, the disclosed method and system applies in general to other mobile communication devices as well, if they acquire the SG priority communication privilege and have the SG capabilities.

What is claimed is:

1. A surveillance applicable prioritized wireless networking communication method comprising:
   acquiring security guard priority communication privilege for a wireless communication device by registering the wireless communication device with a surveillance applicable prioritized wireless network communication service provider;
   storing a device identification number, Emergency Level Code and destination network addresses of a registered security guard wireless communication device in the service provider's data base accessible by wireless networking nodes;
   checking the identification number of a connection requesting device by the wireless networking node when receiving a connection request, and
   granting the surveillance applicable prioritized wireless networking communication to the wireless communication device if the number belongs to a registered security guard wireless communication device;
   acknowledging the connection request from the registered security guard wireless communication device and at the same time initializing surveillance applicable prioritized communication process of the service node, comprising allocation of channel bandwidth and emergency data buffer space and locating proper back end services available in nearby area of the networking node and the wireless communication device;
   entering security guard state of the registered security guard wireless communication device, comprising allocating system resources, connecting to the service node, conducting data collection and scene analysis, selectively packing data into data packets and uploading the data packets to the service node when an Alarm Step is triggered, and updating the destination addresses and Emergency Level Code within a header section of data packets if needed;
   prioritizing a routing of uploaded data packets to the destination addresses by the service node according to the priorities defined in Emergency Level Code, and storing the uploaded data packets into the emergency data buffer of the service node concurrently wherein, if the Emergency Level Code in the data packets indicates a Third Party Surveillance Provider or a Public Security Surveillance Center to be a destination, the networking node checks if the services of the Third Party Surveillance Provider or the Public Security Surveillance Center is available in the serving area of the service node, and if not, the networking node routes optionally the data packets to applicable nearby Public Security Surveillance Centers as a highest priority.

2. The method of claim 1, wherein the security guard state of the security guard wireless communication device comprises conducting automatic surveillance services including acquiring, processing, and packaging one or more items of sensor data including video, image, voice, GPS, thermostats data, lux meter data, gyro data into data packets; and connecting and transmitting the data packets via the wireless channel to the wireless networking node.

3. The method of claim 1, wherein the security guard state of the security guard wireless communication device further comprises the Alarm Step and an Alert Step, wherein the Alert Step comprising conducting automatic scene analysis, system resource budgeting, wireless network connecting, data collecting and processing, automatically triggering Alarm Step once preset conditions are met.

4. The method of claim 1, wherein the security guard state of the security guard wireless communication device further comprises conducting at least partial surveillance services in an ordinary state in background, and even when the services other than for the surveillance of the wireless communication device are powered off to provide around the clock protection.

5. The method of claim 1, wherein the Alarm Step of the security guard state of the security guard wireless communication device comprises starting transmitting data as soon as the wireless communication device and the wireless networking node are ready.

6. The method of claim 1, wherein the data packet comprises the header section and a data section, and the header section has a data structure comprising the wireless communication device identification number of the registered security guard device, the Emergency Level Code, and the network destination addresses.

7. The method of claim 1, wherein the data in data packets comprise real time acquired data by the registered security guard wireless communication device or pre-acquired history data, or a combination thereof.

8. The method of claim 1, comprising the wireless networking node including mobile network stations and WiFi access point nodes.

9. The method of claim 1, wherein the security guard wireless communication device comprises prioritized voice channel connection and usage.

10. The method of claim 1, wherein the security guard wireless communication device comprises a panorama camera apparatus built into a part of the device to enhance its video surveillance capabilities, and the panoramic camera operates as a usual fixed view angle camera when under a convertible mechanical cover, and once the cover is removed, the panoramic camera makes up to three dimensional rotations and translations to acquire panoramic images or videos.

11. The method of claim 1, comprising switching the security guard wireless communication device from the ordinary state to the security guard state and operating the security guard wireless communication device being controllable by an operator using an interactive method operating the device, or remotely through a wireless network by an operator, an operator authorized Third Party Surveillance Provider or Public Security Surveillance Center.

12. The method of claim 6, wherein the network destination addresses comprise one or a combination of network addresses comprised of private network addresses, network addresses of an operator authorized Third Party Surveillance Provider, and network addresses of the Public Security Surveillance Center.

* * * * *